US 6,647,721 B2

(12) United States Patent
Heyne et al.

(10) Patent No.: US 6,647,721 B2
(45) Date of Patent: Nov. 18, 2003

(54) HYDRAULIC SYSTEM FOR SUPPRESSING OSCILLATION IN HEAVY EQUIPMENT

(75) Inventors: Dennis Heyne, Burlington, IA (US); Richard J. Lech, Burlington, IA (US); Eric Sharkness, Troy, MI (US); David W. Swaim, Joliet, IL (US); Guy T. Stoever, Naperville, IL (US); Ian MacLeod, Ames, IA (US)

(73) Assignee: Case, LLC, Racine, WI (US)

( * ) Notice: Subject to any disclaimer, the term of this patent is extended or adjusted under 35 U.S.C. 154(b) by 175 days.

(21) Appl. No.: 10/039,399

(22) Filed: Nov. 7, 2001

(65) Prior Publication Data

US 2003/0084663 A1 May 8, 2003

(51) Int. Cl.[7] .............................................. F16D 31/02
(52) U.S. Cl. ..................................... 60/468; 137/115.13
(58) Field of Search ............... 60/468, 469; 137/115.13

(56) References Cited

U.S. PATENT DOCUMENTS

| | | | | | |
|---|---|---|---|---|---|
| 3,407,946 A | * | 10/1968 | Pilch | ............................ | 91/410 |
| 3,530,766 A | * | 9/1970 | Pilch | ............................ | 91/410 |
| 3,815,766 A | * | 6/1974 | Carlson et al. | .......... | 414/695.5 |
| 4,007,845 A | * | 2/1977 | Worback | ...................... | 91/420 |
| 4,718,325 A | * | 1/1988 | Shore | ........................ | 91/189 R |

* cited by examiner

Primary Examiner—Edward K. Look
Assistant Examiner—Igor Kershteyn
(74) Attorney, Agent, or Firm—Rebecca Henkel

(57) ABSTRACT

The invention provides a system for regulating pressure equalization in hydraulic mechanisms to suppress oscillation in heavy equipment. The system includes a first and second hydraulic lines, a crossover valve in communication with each of the first and second hydraulic lines, a timing system in communication with the crossover valve, and a motion detector in communication with a heavy equipment component. The motion detector senses a linkage motion and operatively opens the crossover valve, which remains open as directed by the timing system.

51 Claims, 9 Drawing Sheets

HYDRAULIC SYSTEM FOR SUPPRESSING OSCILLATION IN HEAVY EQUIPMENT

FIELD OF THE INVENTION

In general, the invention relates to hydraulic systems used in the operation of heavy equipment. More specifically, the invention relates to a electrohydraulic or hydraulic system used for regulating pressure equalization to alleviate harsh oscillation common in the operation of heavy equipment, including but not limited to backhoes, excavators, skid steer drives, crawler drives, outriggers, and wheel loaders.

BACKGROUND OF THE INVENTION

In general, construction and other heavy equipment use hydraulic systems to perform digging, loading, craning, and like operations. The speed and direction of these functions are controlled with hydraulic valves. Typically at the end of a moving function, the implement exhibits uncontrolled changes in speed and direction producing an oscillatory motion. For example, in a backhoe, the oscillatory motion occurs when its linkage is brought to a stop following a side-to-side maneuver. This oscillation makes it more difficult for the backhoe operator to return the bucket to a given position. The oscillation is caused when the kinetic energy generated by the backhoe movement is transferred to the hydraulic supply lines connected to the backhoes actuators when stopping. The transferred energy produces a sharp increase (or spike) in fluid pressure. The increased fluid pressure transfers the energy into the hydraulic system and the surrounding vehicle. The energy then returns in the opposite direction through the hydraulic lines and exerts the force into the nonmoving actuators. This transfer of energy continues until it is dispelled as heat, or is dissipated through the oscillation of the equipment and the swelling of the hydraulic lines.

Thus, there is a need for a hydraulic system for reducing the amount of oscillatory motion that occurs when a swinging backhoe or other heavy machinery component is brought to a stop. Further, there is a need for increasing the accuracy of swinging the backhoe or other heavy machinery linkage to a desired location.

SUMMARY OF THE INVENTION

One aspect of the present invention provides a hydraulic system for regulating pressure equalization to suppress oscillation in a linkage of heavy equipment. The hydraulic system is comprised of a first and second hydraulic line, a crossover valve in communication with the first and second hydraulic lines, a timing system in communication with the crossover valve, and a motion detector in communication with one of the first or second lines. The motion detector senses linkage or control assembly motion and operatively opens the crossover valve, which remains open as directed by the timing system.

Another aspect of the invention includes a method of operating a hydraulic system to regulate pressure equalization. The method of operation includes restricting directional flow of fluid to a crossover valve. The crossover valve is opened when a predetermined pressure differential is reached in a return hydraulic line when decelerating the linkage. The fluid flow between the return hydraulic line and a supply hydraulic line through the open crossover valve is metered for fluid volume. Equalization of a pilot pressure to the crossover valve is then delayed to extend open time of the crossover valve.

In addition, another aspect the invention provides a means for a hydraulic system to regulate pressure equalization. The means includes a check valve for increasing the fluid pressure in a return hydraulic line. Flow control valves allow fluid pressure to be applied to a crossover valve. The crossover valve meters the fluid pressure between the first and second hydraulic lines. Finally, a restrictive means for delaying equalization of the pressure to the crossover valve to extend open time of the crossover valve is provided.

One embodiment of the invention is comprised of a first and second hydraulic lines, a motion detector, and a crossover valve in communication with each of the supply and return hydraulic lines. These components may operate electrically, mechanically, hydraulically, or a combination thereof. The crossover valve does not open during acceleration, and is set to open and allow flow between the supply and return hydraulic lines when a predetermined signal occurs from the motion detector. Fluid flow is then metered between the supply and return hydraulic lines through the crossover valve. A timing system is in communication with the crossover valve to regulate when the crossover valve closes and stops flow between the supply and return hydraulic lines.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PRESENTLY PREFERRED EMBODIMENTS

Figure 1:
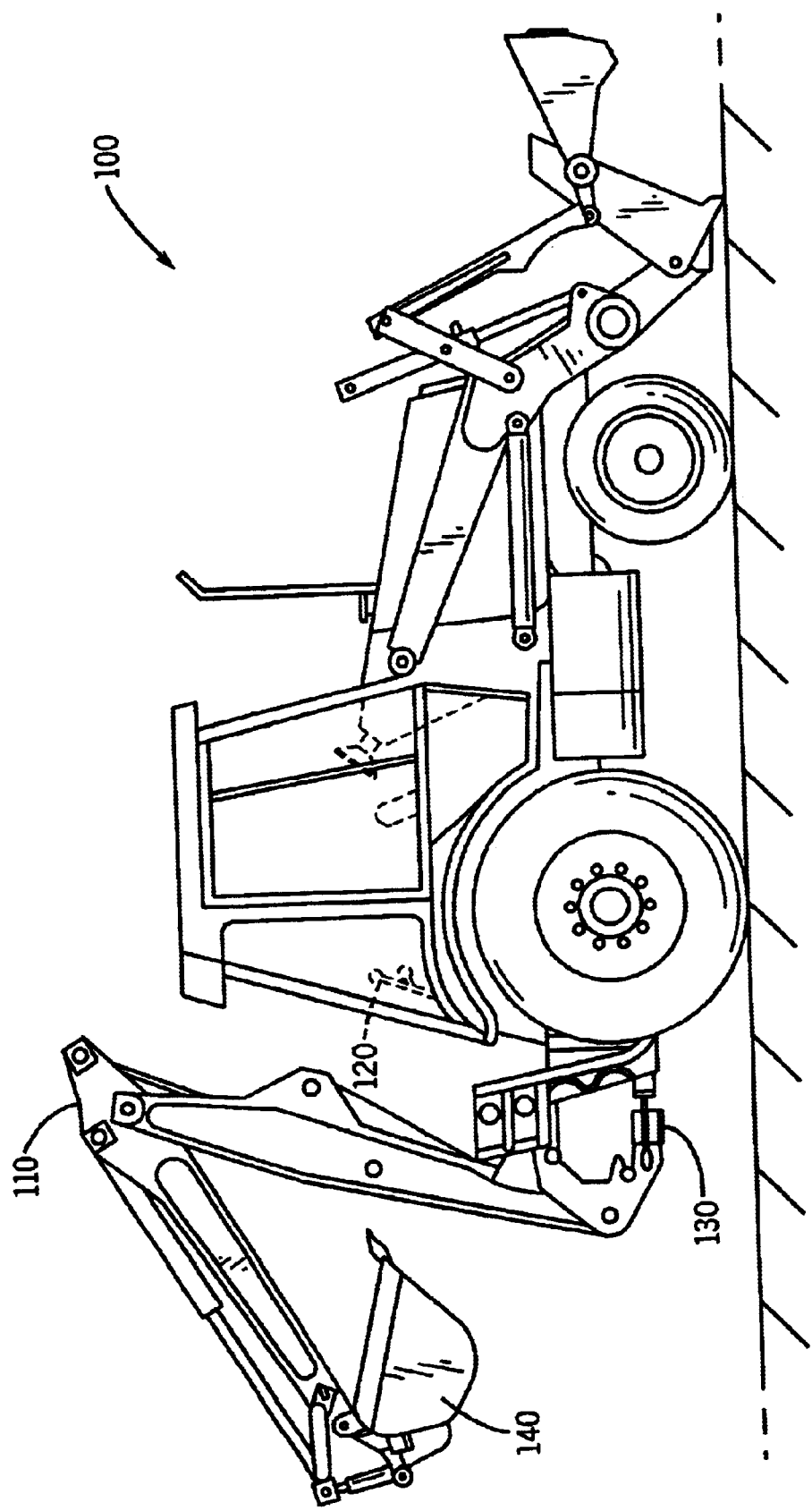
FIG. 1 is an illustration of a vehicle showing the backhoe linkage.

Referring to FIG. 1, one embodiment of a vehicle 100 equipped with a backhoe assembly 110 is shown. A heavy equipment operator typically controls the operation of a bucket 140, which is in communication with the backhoe assembly 110, by using a control assembly 120. The control assembly 120 is in communication with a backhoe linkage 130, which is in communication with the backhoe assembly 110. The operation of the control assembly 120 provides fluid flow direction allowing for the activation of at least one swing assembly actuator also known in the trade as a swing cylinder, which is part of the backhoe linkage 130. The backhoe linkage 130 produces a side-to-side movement of the backhoe assembly 110. It is in the backhoe linkage 130 that a transfer of energy occurs and causes an unwanted oscillation.

An example of the energy transfer is detailed with reference to the embodiment of FIG. 1. When the backhoe linkage 130 is brought to a stop following a side-to-side maneuver, kinetic energy that is generated by the movement of the backhoe assembly 110, is transferred to hydraulic supply lines connected to the backhoe actuators of the backhoe linkage 130. The transferred energy produces a sharp increase (or spike) in fluid pressure. The increased fluid pressure transfers the energy as vector forces throughout the hydraulic system and the surrounding vehicle. The energy then returns in the opposite direction through the hydraulic lines and exerts vector forces back to the non-moving actuators. This transfer of energy continues back and forth until it is dispelled as heat, or is dissipated through the oscillation of the equipment and the swelling and contraction of the hydraulic lines.

Figure 2A:
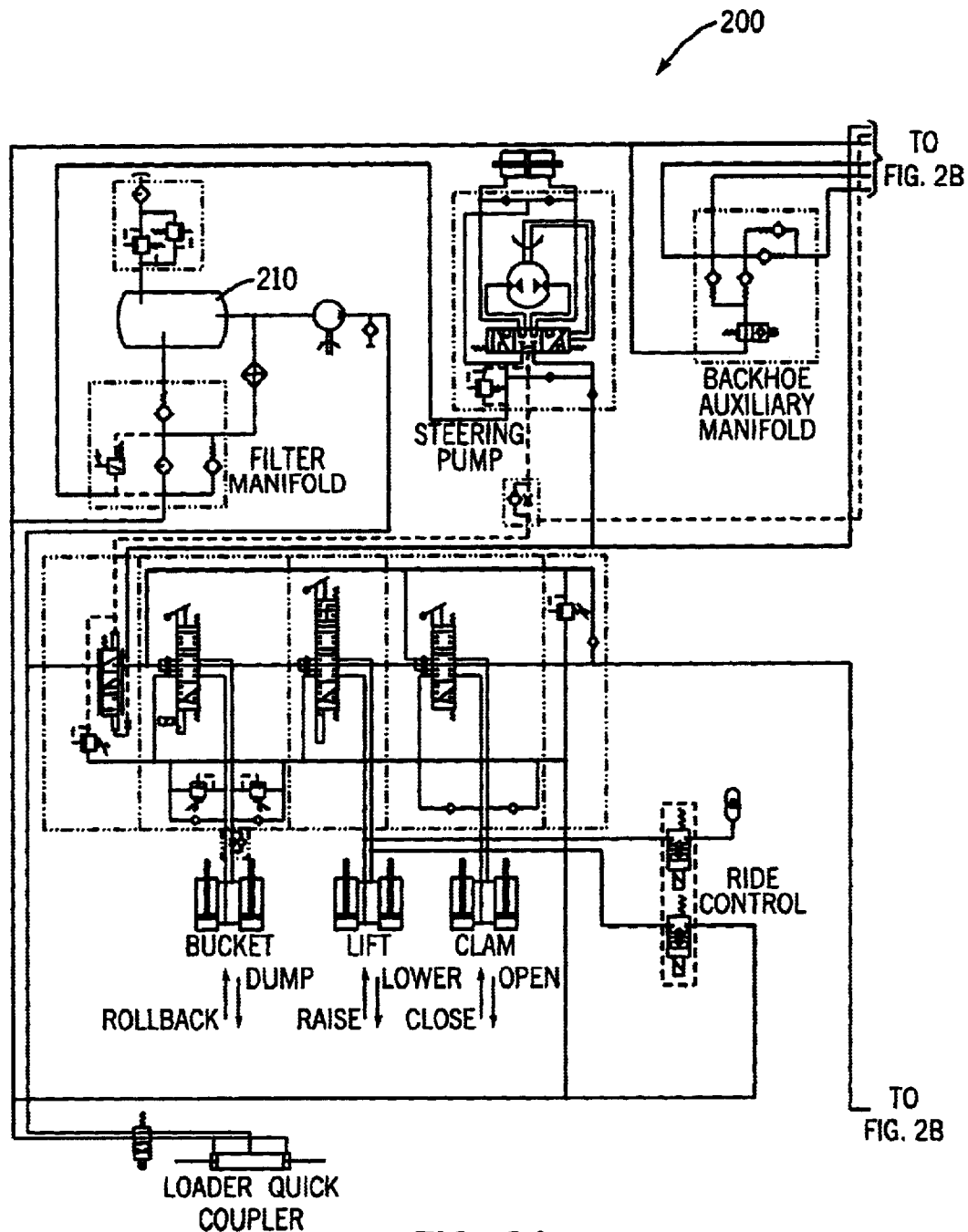
FIG. 2 is a schematic diagram of one embodiment detailing the hydraulic components of the backhoe linkage of FIG. 1.
Figure 2B:
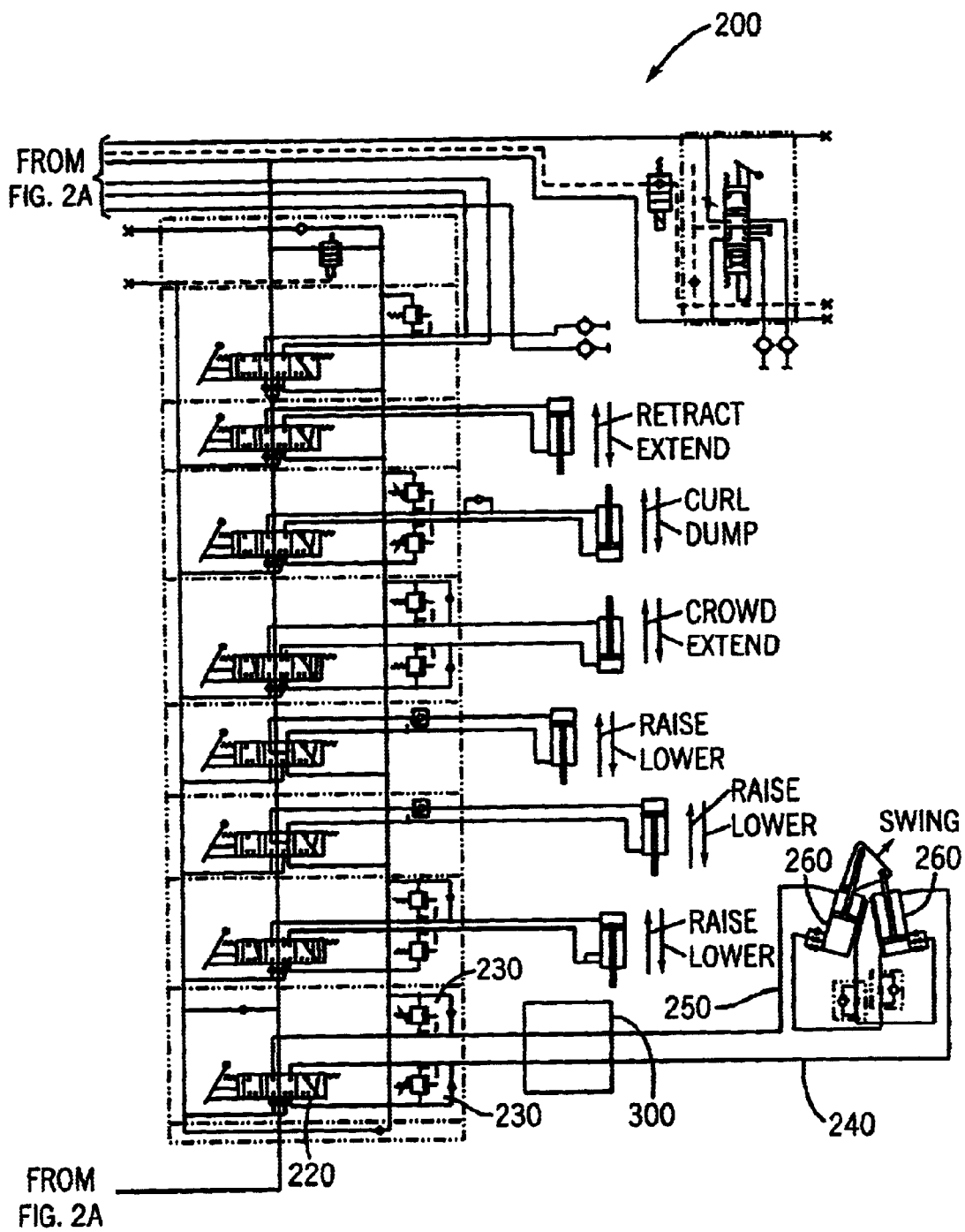

In FIG. 2, the hydraulic components of one embodiment of the invention are illustrated as a schematic 200 detailing a typical piece of heavy equipment utilizing the backhoe assembly 110 of FIG. 1. In this embodiment, a holding tank 210 supplies hydraulic fluid to a control valve 220 via a pump or the like. The hydraulic fluid flows to and from the swing cylinders 260 through the hydraulic lines 240 and 250, with the flow direction controlled by the operations of the control valve 220. The swing cylinders 260 are a component of the backhoe linkage 130, and the control valve 220 is a component of the control assembly 120 of FIG. 1. When the hydraulic line 240, or the hydraulic line 250 experiences an excessive buildup of pressure, a pressure sensitive relief valve 230 opens to allow the pressurized fluid to flow back to the holding tank 210. In this embodiment, the swing cushion device 300 is located in series with the hydraulic lines 240 and 250 between the control valve 220 and the swing cylinders 260 but may be positioned at different locations in alternative embodiments.

Figure 3:
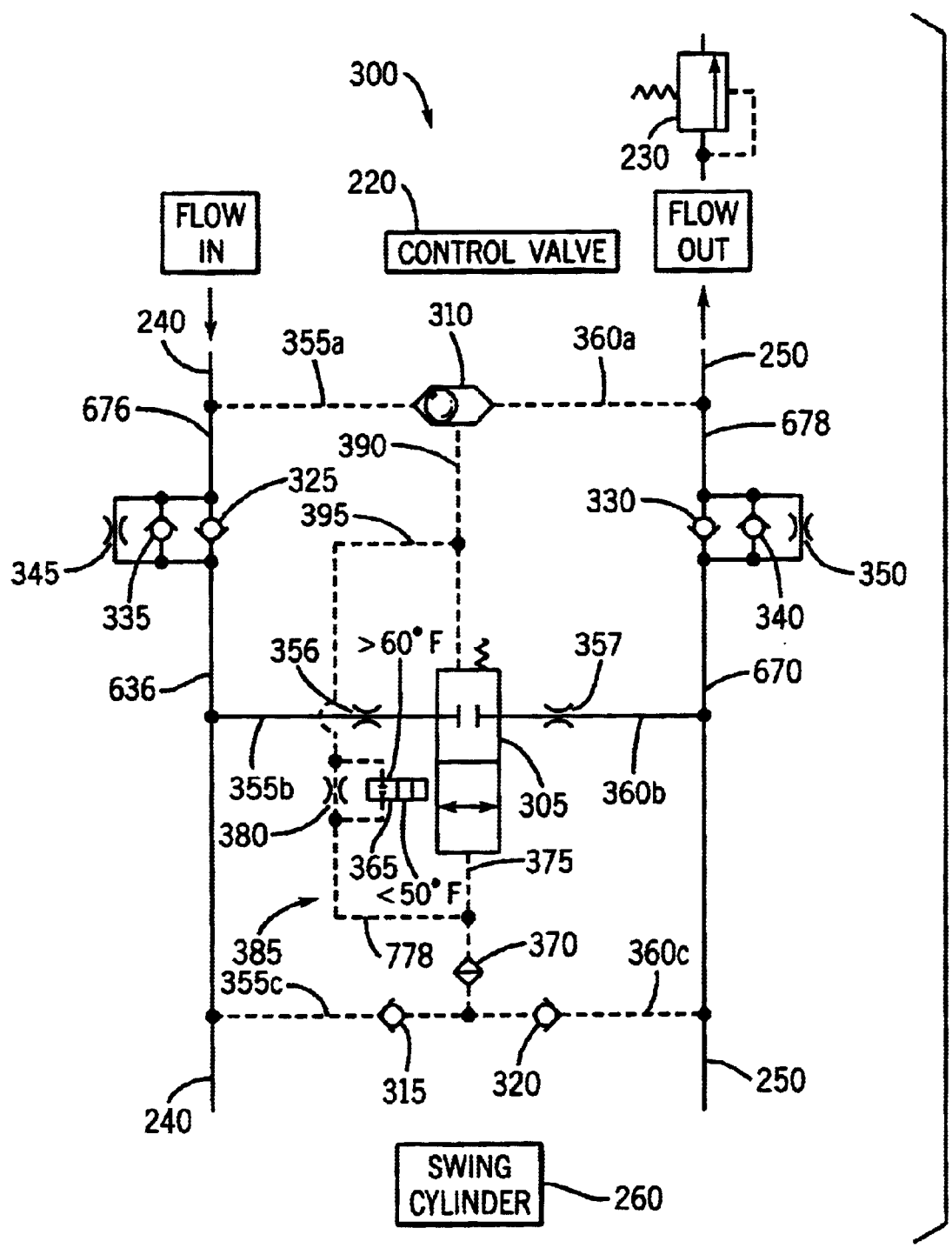
FIG. 3 is a schematic diagram of one embodiment of a hydraulic system, made in accordance with the invention.

One embodiment of the present invention is generally shown as a swing cushion system 300 in FIG. 3. This embodiment is hydraulic in its operation but may be electrical or mechanical or a combination of thereof in alternative embodiments. The invention may be used as in this example, as part of the hydraulic components of a backhoe linkage, as demonstrated in FIG. 2. This embodiment entails the use of hydraulic lines 240 and 250 to supply and reclaim hydraulic fluid to the swing cylinders 260 while the control valve 220 directs the fluid flow. The hydraulic lines 240 and 250 may be of any variety used for the transfer of hydraulic fluid, with the hydraulic fluid being of any conventional type. The swing cylinders 260 are common in the trade and may vary in size, purpose, and number. A motion detector is used to control the flow of fluid to a crossover valve 305. The motion detector may comprise a variable potentiometer, or other electrical device that detects a measurable property such as resistance or voltage, or a pressure generator such as a check valve or orifice, and is in communication with either the control assembly 120 or the backhoe linkage 130. A motion detection system consisting of components 325, 330, 310, 315, 320 is shown as an illustrative example of one embodiment. An alternative embodiment of the motion detection system may sense fluid pressure, mechanical movement, or controller activation. The hydraulic line 240 is in series communication with check valves 335 and 325, and a bypass orifice 345. The hydraulic line 250 is in series communication with check valves 330 and 340, and a bypass orifice 350. The check valves 335, 325, 330, and 340 may allow flow in varying direction and activation pressures, and an alternative number or type of flow control systems known in the art may be used. The bypass orifice's 345 and 350 may be conventional bypass orifice's. Alternatively, other flow restricting mechanisms may be used or combined with the flow control check valves 335, 325, 330, and 340. Prior to and after the parallel check valves and bypass orifice, hydraulic lines 240 and 250 are in communication through hydraulic lines 355A, 355c, 360A, and 360c with flow control valves 310, 315, and 320. In FIG. 3 the flow control valves are depicted as a shuttle valve and a pair of check valves respectively, but may be comprised of alternative directional flow control variations. Flow control valve 310 is in communication with a spring side operational port of the crossover valve 305 through a hydraulic line 390. The crossover valve 305 may be a spool, poppet, solenoid, or other variable position electrohydraulic or hydraulic valve, and may alternatively be directed to open by motion, pressure, or electric means. A timing system for determining how long the crossover valve 305 allows flow between the hydraulic line 240 and the hydraulic line 250 can be used. The timing system may be electronic, electrohydraulic, or hydraulic as known in the art. A hydraulic timing system comprised of components 385, 325, 330, and 230 is shown as an illustrative example 300. The crossover valve 305 may use a spring tension system for operation but a valve using an alternative operating system know in the art may be used. The flow control valves 315 and 320 are in communication with a delay volume 375, which is a volume created by the opening of the crossover valve 305. During the closing of the crossover valve 305, the fluid in the delay volume flows through a restrictive system 385 via hydraulic line 395. The restrictive system 385 is comprised of the delay volume 375, a thermal actuated valve 365, and a delay orifice 380. Between the delay volume 375 and its connection with hydraulic lines 355c, 360c, and 395 is a fluid filter 370. The crossover valve 305 is further in communication with hydraulic lines 240 and 250 through hydraulic lines 355B and 360B respectively, and becomes a metered flow system between hydraulic lines 240 and 250 when the crossover valve 305 is activated. The metered system of hydraulic lines 355B and 360B are portrayed in FIG. 3 as crossover orifices 356 and 357 but alternative metering systems known in the trade may be used. Further, in communication with hydraulic lines 240 and 250 is at least one relief valve 230. The relief valve 230 uses a spring tension system for operation but a valve using an alternative operating system may be used.

An example of one embodiment of the invention as illustrated in FIG. 3 is detailed next. While the backhoe linkage 130 is not actuated (as when the control assembly 120 is in neutral), the bypass orifice 345 with a restrictive diameter of 0.030", acts as a bypass of the 100-psi check valve 325. The bypass allows fluid from the swing cylinders 260 side of the swing cushion device 300 to replace any fluid seeping from the hydraulic line 240, through the control valve 220. This is done to keep the pressure difference between the flow control valve 310, and flow control valves 315 and 320, below the 40-psi differential needed to shift the spring tension of crossover valve 305.

When the control assembly 120 is operated to actuate the backhoe linkage 130, the pressure in the supply line 240 is higher than the pressure in the reclaim line 250 because of the load induced to accelerate the backhoe assembly 110 on the swing cylinders 260. The higher pressure on the supply side acts to open the flow control valves 310 and 315 on the supply line 240 side. The open flow control valve 310 allows for the supply line 240 to act upon the hydraulic line 390. Hydraulic line 390 in turn acts upon the restrictor assembly 385 and crossover valve 305. The open flow control valve 315 allows for the supply line 240 to act upon the delay volume 375, which in turn acts upon the restrictor assembly 385 and crossover valve 305. Because the 5-psi check valve 335 restricts the fluid flowing in the supply line 240, the pressure on the restrictor assembly 385 and crossover valve 305 from the flow control valve 310 is higher than the pressure on the restrictor assembly 385 and crossover valve 305 from the delay volume 375. The resulting pressure differential is higher on the spring side of the crossover valve 305, which prevents the crossover valve 305 from shifting open.

When the control assembly 120 is operated to actuate the backhoe linkage 130 to decelerate the backhoe assembly 110, the pressure in the reclaim line 250 becomes higher than the pressure of the supply line 240 because of the load induced on the swing cylinders 260 by the kinetic energy of the backhoe assembly 110. The kinetic energy is transferred as fluid pressure in the reclaim line 250 closes flow control valve 315 and forces open the flow control valve 320. The open flow valve 320 allows the reclaim line to act upon the restrictor assembly 385. This produces a higher pressure being exerted through the restrictor assembly on the non-spring side of the crossover valve 305, but the pressure differential between the non-spring side and the spring side of the crossover valve 305 remains below the 40 psi needed to activate the crossover valve 305. If the flow and pressures of fluid in the return line 250 is great enough, the 100-psi check valve 330, preset to restrict flow to the opposite direction of the check valve 340, opens and creates a pressure differential in the reclaim line 250. This condition shifts the flow control valve 310 to open to the reclaim line 250 side and results in a higher pressure being exerted through the restrictor assembly 385 on the non-spring side of the crossover valve 305, than on the spring side. If the pressure differential between the two ports of the crossover valve 305 surpasses the 40-psi spring tension, the crossover valve 305 will open. The open crossover valve 305 permits a flow of pressurized fluid between the supply line 240 and the reclaim line 250 through the hydraulic lines 355B and 360B. In hydraulic lines 355B and 360B are crossover orifices 356 and 357, restricting the fluid flowing through hydraulic lines 355B and 360B. This results in improved 'metering' of the pressure equalization between the supply and reclaim lines 240 and 250.

While stopping the motion of the backhoe assembly 110, just before to just after returning the control lever of the controlling assembly 120 to neutral, some flow may pass through the control valve 220 and exit through the relief valve 230. The release of fluid through the relief valve 230 aids in maintaining the pressure differential exerted on the crossover valve 305, which prevents it from closing. When the exiting fluid pressure becomes lower then the spring tension of the relief valve 230, the relief valve 230 closes and the flow of fluid through the 100-psi check valve 330 stops. This causes the pressure exerted on the crossover valve 305 to equalize, resulting in the pressure differential to decrease below the 40-psi spring tension of the crossover valve 305, and the crossover valve 305 begins to shift closed.

When the crossover valve 305 begins to close, the restrictor assembly 385 controls the time required to complete the closing. It does this by slowing the flow of fluid between the non-spring side and spring side of the crossover valve 305, thus keeping the crossover valve 305 shifted for a short amount of time after the differentiating pressures have become negligible. At this time any pressure fluctuations within the supply line 240 and reclaim line 250, caused by the oscillating effect, are dampened by the fluid flow through the hydraulic lines 355B and 360B, and the crossover valve 305. This results in the reduction of the oscillatory motion when the swinging backhoe assembly 110 is brought to a stop.

In the illustrated embodiment, the restrictor assembly 385 of the swing cushion device 300 incorporates a 0.018" diameter delay orifice 380, a thermal actuator 365 and a delay volume 375. The restrictor assembly 385 regulates the shifting of the crossover valve 305 to the closed position. The thermal actuator 365 regulates the orifice size as oil temperature varies. The thermal actuator 365 adjusts the amount of pressure drop through the restrictor assembly 385 as temperature varies above or below a prescribed temperature, shown in this embodiment as open below 50° F. and closed above 60° F. In alternative embodiments, a solenoid and a temperature sensitive switch, a bimetallic element, or wax element could also be used as the thermal actuator 365. An in line filter 370 can be used to prevent contamination from affecting the operation of the restrictor assembly 385.

Figure 4:
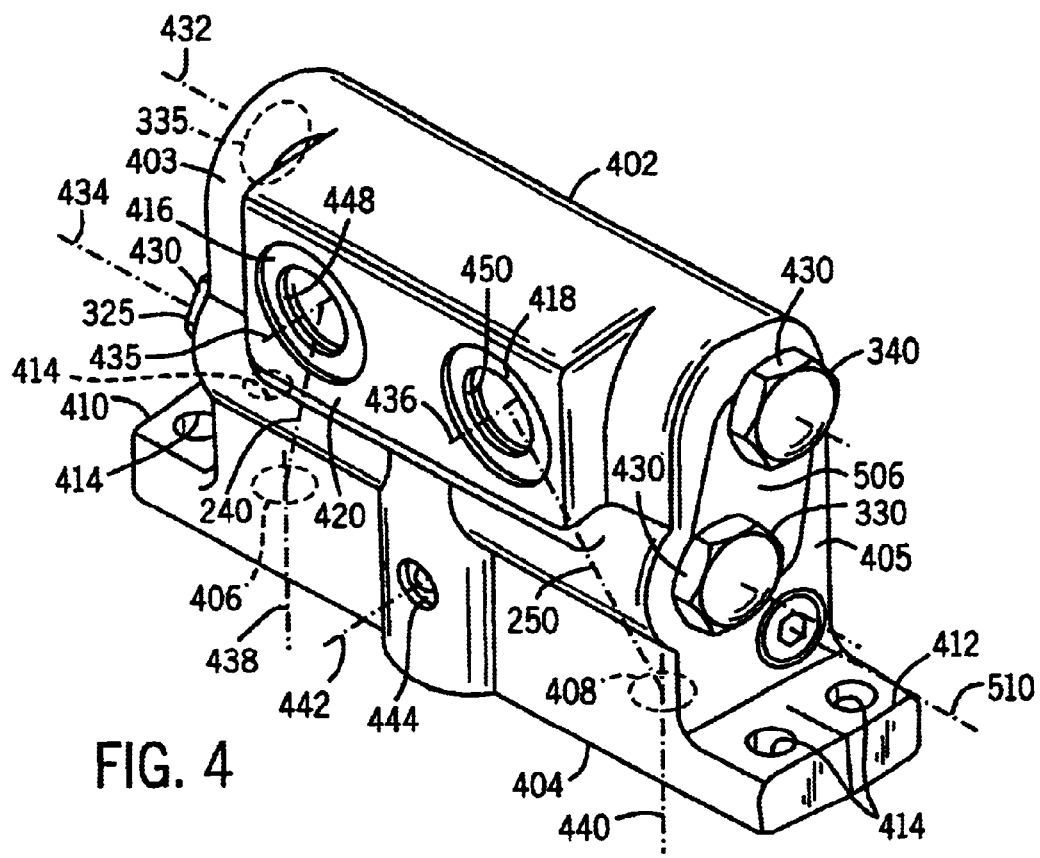
FIG. 4 is a perspective view of one embodiment of the swing cushion device shown in FIG. 3.

FIG. 4 is a physical embodiment of the circuit of the swing cushion device 300 shown in FIG. 3. A valve body 402 has a lower surface 404 in which two input ports 406 and 408 are disposed. Two mounting brackets 410 and 412 extend outward from the valve body, each including two mounting holes 414. Holes 414 are in parallel spaced apart relationship in each of the mounting brackets 410 and 412. Two additional ports 416 and 418 extend from a first side 420 of valve body 402. Four check valves 335, 325, 340 and 330, are threadedly engaged with valve body 402. Each of the check valves 335, 325, 340 and 330 has a plurality of outwardly facing surfaces 430 (in this embodiment hexagonal oriented wrenching flats) that are configured to be engaged with an externally applied tool to unscrew each of the check valves from valve body 402. Thus, in order to remove or replace any of the check valves, a wrench or similar tool can be coupled to the surfaces 430 and the check valve unscrewed.

Ports 406 and 408 are configured to be coupled to mating ports on control valve 220 (FIG. 2). In a preferred embodiment, these mating ports (not shown) are on an upper surface of the valve body of control valve 220. In addition, control valve 220 preferably has threaded openings that are configured to receive headed fasteners extending through holes 414 into the valve body of control valve 220. In this manner, valve body 402 can be fixedly mounted directly to control valve 220 with no intermediate hoses or other connections, other than seals disposed between valve body 402 and the valve body of control valve 220. When these threaded fasteners are tightened, it pulls bottom surface 404 of valve body 402 into fluid tight engagement with a corresponding outer surface of the valve body of control valve 220.

To provide for easier maintenance, two check valves 335 and 325 are disposed on one end 403 of valve body 402 in parallel axial orientation and the other two check valves 340 and 330 are disposed on the opposing end 405 of valve body 402 in a similar parallel axial relationship. More preferably, check valves 335 and 340 are preferably coaxial as shown by their shared axis 432. More preferably again, check valves 325 and 330 are also preferably coaxial, as shown by their shared axis 434.

As shown schematically in FIG. 4, hydraulic line 240 (FIGS. 3 and 4) extends between and fluidly couples port 406 and port 416. In similar fashion, hydraulic line 250 extends between and fluidly couples 408 and port 418.

Port 416 is formed in the surface of valve body 402 such that it defines a central longitudinal axis 435 that is generally parallel to bottom surface 404. Port 418 similarly defines central longitudinal axis 436 which is also generally parallel to bottom surface 404. Port 406 defines central longitudinal axis 438 that is generally perpendicular to bottom surface 404 and to axis 435. Port 408 defines central longitudinal axis 440 which is perpendicular to bottom surface 404 and to axis 436. Axes 435 and 436 are parallel. Axes 438 and 440 are also parallel.

Hydraulic line 390 (FIGS. 3, 6 and 10) is partially defined by a bore extending into valve body 402 and defining central longitudinal axis 442. Once hydraulic line 390 is formed, an outer end is plugged with threaded plug 444. Plug 444 is provided with surfaces 446 on an outer surface thereof which are configured to be engaged by a tool. In this example, surfaces 446 are wrenching flats configured in a hexagonal relationship. To balance the flow out of ports 416 and 418, each port has the same size opening as the other. In addition, the pitch of the threads, 448 of port 416, are sized to couple port 416 to a hydraulic fitting. In a similar fashion, the threads 450 on port 418 are also configured to engage a hydraulic fitting. Threads 448 and 450 preferably have the same pitch.

Figure 5:
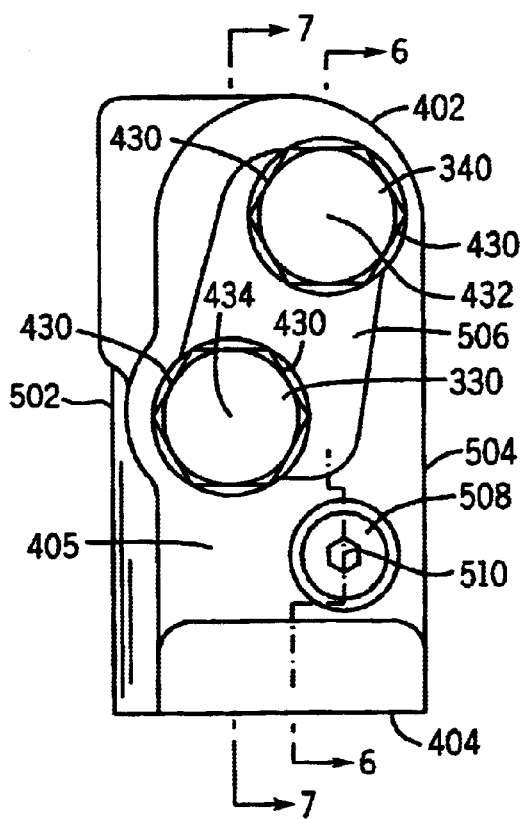
FIG. 5 is an end view of the device of FIG. 4.
Figure 6:
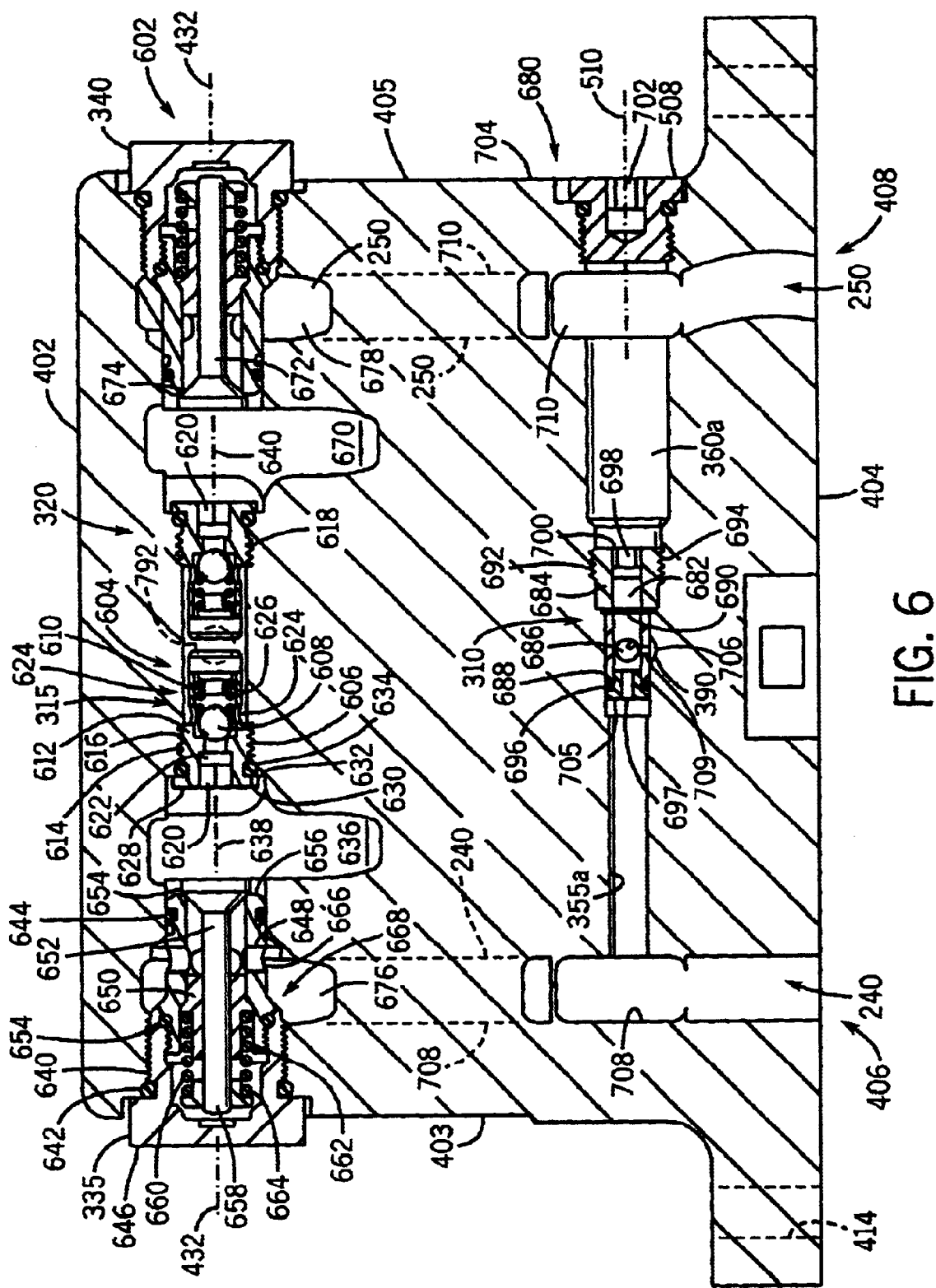
FIG. 6 is a sectional view of the device of FIGS. 4 and 5 taken at section line 6—6 in FIG. 5.

FIG. 5 illustrates an end view of valve body 402 showing the arrangement of check valves 340 and 330. In this embodiment, the other end of valve body 402 is similarly arranged, but in a mirror image to that shown in FIG. 5. Check valves 340 and 330 are spaced apart both vertically (i.e., with respect to bottom surface 404) and laterally between lateral side surfaces 502 and 504 of valve body 402. Valve body 402 is preferably made of a single casting. As shown in FIG. 5, a surface 506 is machined from the casting in a subsequent operation and it is into that machined surface that both of check valves 340 and 330 are threadedly engaged. A stepped bore is also formed in valve body 402 and defines hydraulic lines 355A and 360A (FIGS. 3 and 6). The open end of this bore is threaded and is closed off by a plug 508 which is threadedly engaged with the threads on the free end of the bore. Plug 508 defines a central longitudinal axis 510 that is parallel to axes 432 and 434 of check valves 340 and 330.

Reference is now made to FIG. 6 which shows a cross-sectional view of valve body 402 and its internal components taken at section line 6—6 in FIG. 5.

A through bore 602 is formed in valve body 402 and extends from one end 403 of the valve body to the other end 405 in an upper portion thereof. This through bore has a series of stepped surfaces formed with smaller diameters as the through bore extends from each end of the valve body into the center 604 of the through bore. In facing arrangement disposed on either side of the central portion 604 of the through bore are check valves 315 and 320. These check valves are provided in the form of threaded inserts that include a check valve body 606, a ball 608, and a spring 610 for holding the ball against a seat 612. The ball 608 is spherical. Seat 612 is circular. When threaded portion 614 of the outer cylindrical surface of the check valves is threaded to engage with mating threads 616 formed in through bore 602. There are two of these threaded portions of through bore 602 disposed on opposing sides of central portion 604. One threaded inner cylindrical surface 616 is configured to engage the mating threads on check valve 315. The other inwardly facing cylindrical threaded portion 618 of through bore 602 is configured to threadedly engage with check valve 320. Each of the check valves has a plurality of surfaces 620 that are configured to engage an installation and removal tool. In the embodiment shown here, surfaces 620 are wrenching flats forming the internal surface of cylindrical cavity 622 and disposed to define a hexagon that is sized to receive a hexagonal wrench, such as an "Allen" wrench. In addition, this internal cavity 622 also defines a fluid flow passageway extending from an outer surface of the check valve substantially along the central longitudinal axis 638 of the check valve and between seat 612 and ball 608 of the check valve. Several flow ports 624 are provided in an outer wall of the check valve to permit fluid to flow from a ball retaining chamber 626 formed by the valve body 606, out of the check valve and into central portion 604 of through bore 602. A flange 628 extends radially outward from valve body 606 on the fluid input end of the check valve. The flange has an annular planar surface 630 that engages a mating planar surface 632 formed in through bore 602. A polymeric O-ring 634 extends around the outer circular cylindrical surface of the valve body 606 and is compressed against an annular planar mating surface formed adjacent to 632. When body 606 of the check valve is screwed into through bore 602, it mates with threads 616 formed in the inner surface of through bore 602. The check valve eventually compresses surfaces 630 and 632 together and seals against O-ring 634 thereby providing a fluid proof seal between the outer wall of the check valve and the inner wall of through bore 602.

Each of check valves 315 and 320 are generally cylindrical and define a longitudinal cylindrical axis. Check valve 315 defines longitudinal cylindrical axis 638 and check valve 320 defines longitudinal cylindrical axis 640. Axes 638 and 640 are preferably the same. In addition, they are preferably the same as central longitudinal axis 432 of through bore 602. Both the spherical balls employed in both check valve 315 and check valve 320 have centers that intersect their respective axes 638 and 640. In addition, their centers preferably intersect longitudinal axis 432 of through bore 602. In addition, the spherical balls of both of check valves 315 and 320 preferably have the same diameter. Furthermore, the rated flow rates through each of check valves 315 and 320 are preferably the same.

Since the check valves are arranged in a back-to-back fashion, they are configured to be removed from opposing ends of through bore 602. To remove check valve 315, check valve 335 is first removed from valve body 402. By removing check valve 335, an open passageway in bore 602 is provided extending from outside valve body 402 to the tool engaging surfaces 620 of check valve 315. A tool, such as the "Allen" wrench described above is inserted into the void in bore 602 formed by the removal of check valve 335 and is inserted into cylindrical cavity 622 provided in the end of check valve 315 whereupon it engages the tool engaging surfaces 620. When the tool is grasped and rotated, either manually, or with a power tool disposed outside of valve body 402, in a counter-clockwise direction of rotation, check valve 315 is threadedly disengaged from threads 616 of through bore 602 and can be removed through the void created by the removal of check valve 335. The process of installing check valve 315 is the reverse of the above-described removal process. The check valve 315 is mounted on the tool, is inserted into the void otherwise blocked by check valve 335 in a direction generally parallel with the longitudinal axis 432 of through bore 602 until the threads on check valve 315 engage the mating threads 616 in through bore 602. When the threads have engaged, the tool is rotated in a clockwise direction, threading the check valve into through bore 602 until the two mating surfaces 630 and 632 are engaged and O-ring 634 is sufficiently compressed to provide a fluid-tight seal. Once the check valve 315 is so installed, check valve 335 may be inserted into the void formed in the open end of through bore 602 and similarly threaded into engagement with valve body 402. This process is performed identically to remove and insert check valve 320 in the opposing end of through bore 602 except instead of removing check valve 335 to provide the tool-receiving cavity, check valve 340 is removed and replaced as described in the above paragraph.

Check valve 335 and check valve 340 are also installed in through bore 602. These valves are similarly constructed, and therefore only one of them (check valve 335) will be described in detail. Check valve 340 is identical in construction and operation.

Check valve 335, like check valves 315 and 320 is in the form of a cartridge, which is threadedly engaged in through bore 602 and can be removed for repair or replacement. Check valve 335 includes a valve body 639 that defines an outer surface having threads 640. Two O-rings, 642 and 644, are mounted on the outer surface of valve body 639 to seal check valve 335 against through bore 602. The valve body 639 itself, is preferably in the form of two cylindrical portions 646 and 648 that are threadedly engaged to each other. Together, these two portions collectively define an internal chamber 650 in which a headed valve member 652 is disposed. Valve member 652 has a head 654 at one end with a circular outer surface that engages a similar circular valve seat 656 formed on valve body 639. These two surfaces, when engaged, form one end of internal chamber 650 of check valve 335. Valve member 652 also includes a shaft 658 that is coupled to head 654 and extends through chamber 650 to the other end of check valve 335. A helical spring 660 is coiled around shaft 658 in chamber 650 between the inner surface of valve body 639 and the outer surface of shaft 658. One end 662 of the spring is coupled to a supporting surface on the inside of valve body 639. The other end 664 of the spring, is coupled to the end of shaft 658. Spring 660 is a compression spring, and with this arrangement is disposed to hold valve member 652 in sealing engagement with seat 656, thereby preventing fluid flow from passing between head 654 and seat 656 until the fluid pressure applied inside chamber 650 is greater than the spring force generated by spring 660 holding the valve and seat closed. Several fluid openings 666 are formed in valve body 639 to provide a fluid passageway extending between an outer central portion 668 of check valve 335 and chamber 650. In this manner, fluid is permitted to flow from the outer central portion of check valve 335 into chamber 650 and to act upon valve member 652 thereby opening check valve 335 if the pressure of that fluid is sufficient to overcome the spring force of spring 660. Once valve member 652 is moved away from seat 656, fluid flows through the gap defined therebetween and into chamber 636. A similar and mirror image chamber 670 is formed at the other end of through bore 602 and is similarly disposed at the outlet of check valve 340. Since check valve 340 is constructed identical to check valve 335 in the preferred embodiment, fluid likewise flows from the outside central portion of check valve 340 through identical fluid passageways extending into the central portion of valve 340 and out through the gap formed between the valve member 672 and the circular seat 674 against which valve member 672 seals.

Chambers 636 and 670 are in immediate fluid communication with ports 416 and 418 respectively, and are shown in FIG. 3 as hydraulic fluid nodes 636 and 670 for convenience. O-rings 642 and 644 of check valve 335 seal off fluid flow between the walls of through bore 602 and the outer surface of valve body 639. The two O-rings are disposed in a spaced apart relation along the outer surface of valve body 639, thereby creating a fluid seal containing chamber 676 and the inlet holes 666 of check valve 335. In a similar fashion, due to their identical construction, two O-rings similarly disposed on check valve 340 create a fluid seal containing chamber 678 and the inlet holes of check valve 340. Fluid chambers 676 and 678 are represented as regions 676 and 678 of hydraulic lines 240 and 253 in FIG. 3.

A second bore 680 is formed in valve body 402 and is disposed closer to base 404 of valve body 402. Bore 680 is a stepped bore and defines a fluid communication path between hydraulic line 240 and hydraulic line 250 and hydraulic line 390. A bi-directional check valve 310 is disposed in a central portion of bore 680 coaxial with bore 680. This check valve is in the form of a unitary insert or cartridge insert having a central chamber 682 defined inside valve body 684 that contains a spherical check valve ball 686. The internal diameter of chamber 682 is defined such that ball 686 can move from end-to-end in the check valve, alternately engaging a first seat 688 at one end of check valve 310 and a second seat 690 disposed at the other end of check valve 310. Check valve 310 sub-divides through bore 680 into hydraulic fluid lines 355A and 360A (see FIG. 3). Valve body 684 includes an externally threaded end portion 692 that is configured to threadedly engage an internally threaded wall portion 694 of bore 680. A circular O-ring 696 extends around the circumference of valve body 684 at an opposing end of valve body 684 to provide a fluid tight seal between valve 310 and the walls of bore 680. In this manner, fluid flow from hydraulic line 355A is compelled to pass through orifice 697 formed in one end of valve body 684 and fluid flow is compelled to pass through a second orifice 698 formed in the other end of valve body 684. Several surfaces 700 are disposed in an inwardly facing hexagonal relationship with respect to each other on an interior wall of check valve 310 that is open and configured to receive the extraction or insertion tool. To remove check valve 310, plug 508 is first removed by inserting a hexagonal tool, such as an "Allen" wrench into hexagonal socket 702 of plug 508 and rotating the wrench in a counter clockwise direction about axis 510. By removing plug 508, the portion of bore 680 between end 704 of valve body 402 (i.e., the open end of bore 680) and check valve 310 is configured as a straight tool receiving passageway extending between the outer surface of valve body 402 and the wrenching surfaces 700 of valve 310. The next step in the removal process is the insertion of a second wrench configured to engage surfaces 700 of valve 310 into this straight tool receiving passageway or void until it is received in and engaged by surfaces 700. Once the wrench is engaged with the surfaces, an end of the wrench extending outside the valve body is rotated in a counter clockwise fashion thereby unthreading external threads 692 on valve 310 from threads 694 formed on an inner surface of bore 680. This process of rotation continues until the threads are completely disengaged, at which point the check valve 310 can be removed through the opening provided by the removal of plug 508 either manually or by the application of fluid pressure on end 705 of valve 310. The process of inserting and installing check valve 310 is the reverse of this removal process.

An intersecting bore 706 penetrates bore 680 generally half way along the length of bore 680. Bore 706 (better shown in FIG. 10) is drilled generally perpendicular to bore 680 and intersects bore 680 at a right angle. Fluid flowing either through hydraulic line 355A or hydraulic line 360A, both defined by portions of bore 680, enters into check valve 310 through orifices 697 and 698 disposed at opposing ends of check valve 310 and exits through through holes 709 formed in valve body 684 and defining a fluid passageway between interior chamber 682 of check valve 310 and an outer surface of body 684. Fluid passageways 709 permit fluid flow from chamber 682 to the outer surface of check valve 310 in a central region thereof defined between O-ring 696 and threads 692. The outer surface of valve body 684 in this central region is smaller in diameter than the portion of through bore 680 which surrounds it defining a cylindrical fluid passageway therebetween. Fluid passing through openings 709 in valve body 684 passes into this cylindrical region and is conducted into through bore 706 which defines hydraulic line 390 (FIG. 3).

Fluid flow into check valve 310 through either orifice disposed at either end of check valve 310 exits check valve 310 in the same manner: through openings 709 in valve body 684 and into intersecting perpendicular bore 706.

Both bore 680 and bore 706 are spaced generally the same distance from lower surface 404 and are both generally parallel to surface 404.

Two fluid conduits 708 and 710 extend upward and are in fluid communication with ports 406 and 408, respectively. These fluid conduits, indicated as hydraulic lines 240 and 250, respectively, in FIG. 3, are fluidly coupled with through bore 680, which intersects both conduits. Fluid conduit 708 is in direct fluid communication with chamber 676 which surrounds the central portion of check valve 335. Fluid conduit 710 is in direct fluid communication with chamber 678 which surrounds the central portion of check valve 340. In this arrangement, the fluid introduced into port 406 can flow through conduit 708 into hydraulic line 355A defined by bore 680 into check valve 310 or it can also flow through conduit 708 into chamber 676 and thence into and through check valve 335. In a similar fashion, hydraulic fluid introduced into port 408 can flow through conduit 710, can flow into hydraulic line 360A defined by bore 680 and thence into check valve 310 or it can flow through conduit 710 into chamber 678 disposed about the entrance of check valve 340 and thence into and through check valve 340.

Figure 7:
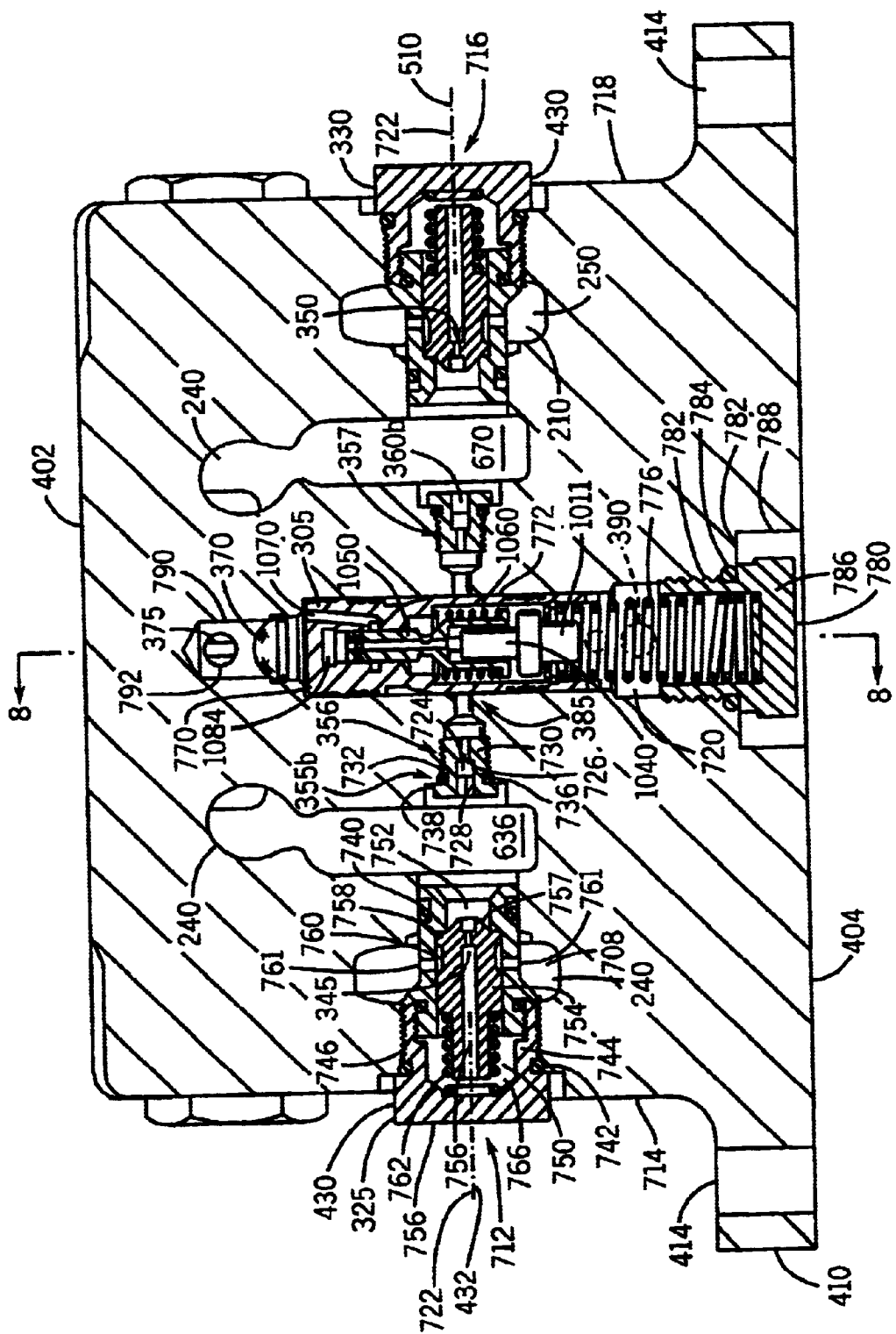
FIG. 7 is a sectional view of the device of FIGS. 4–6 taken at section line 7—7 in FIG. 5.

Referring now to FIG. 7, a further view of valve body 402 is shown in cross-section taken at line 7—7 in FIG. 5. Check valve 325 is illustrated on the left hand side of FIG. 7 and check valve 330 is illustrated on the right hand side of FIG. 7 in cut-away. In the central portion of FIG. 7 is a cross-over valve 305 with its internal restrictive system or restrictor assembly 385. Check valve 325 is in the form of an insert that also includes an integral orifice 345. Check valve 330 is also in the form of an insert and includes an integral orifice 350. Both the check valves and the orifices are shown in schematic form in FIG. 3.

Check valve 325 is threadedly engaged in bore 712 formed in end 714 of valve body 402 just above mounting bracket 410. Similarly, check valve 330 is threadedly engaged in bore 716 which is formed in end 718 of valve body 402. End 718 and end 714 define opposite ends of valve body 402 and face in opposite directions. Bore 712 is a stepped bore and extends from an outer surface of valve body 402 to a central region of valve body 402 where it intersects bore 720 in a central region thereof. Bore 716, likewise extends from an opposing outer surface of valve body 402 inward to a central region of the valve body where it intersects with bore 720 in a central region thereof. The points of intersection of bores 716 and 712 are at the same depth (i.e., the same vertical position as shown in FIG. 7) inside bore 720. Each of bores 712 and 716 intersect bore 720 on opposite sides of bore 720, thereby providing symmetrical fluid flow into and out of bore 720. Each of stepped bores 712 and 716 are identical. They only differ in their orientation in that they are formed in opposing surfaces of valve body 402 and therefore face in opposite directions. They share a common longitudinal axis 722, and thus are co-axial. Check valve 325 has a longitudinal axis 432 that is co-extensive with axis 722. Similarly, check valve 330 has a longitudinal axis 510 that is also co-extensive with axis 722. Bore 712 intersects chamber 636 and conduit 708. Check valve 325 is disposed in bore 712 such that it controls fluid flow between chambers 636 and conduit 708. Bore 712 also provides fluid communication between chamber 636 and bore 720. The portion of the bore interconnecting chamber 636 and bore 720 shown in FIG. 7 as hydraulic line 355B. An orifice 356 is disposed in the portion of bore 712 extending between chamber 636 and bore 720 (i.e., hydraulic line 355B). Orifice 356 is configured as a unitary removable device having an internally defined passageway 724 that includes a narrow orifice region 726 and a tool engaging portion 728. Tool engaging portion 728 has a plurality of inwardly-facing hexagonally-arranged flat surfaces configured to engage a tool, for example, an "Allen" wrench. The body 730 of orifice 356 has a threaded external surface portion 732 that is engaged with a mating threaded internal surface of bore 712. An O-ring 736 is disposed circumferentially around body 730 to provide sealing engagement between an inner cylindrical wall of bore 712 and an outer cylindrical surface of body 730. In this manner, fluid leakage through hydraulic line 355B that by-passes orifice 356 is prevented. An annular flange 738 is disposed at the outer end of orifice 356 and has an inner planar surface that engages a mating outer facing planar surface of bore 712. It is the interference between these two surfaces that locks orifice 356 in place when orifice 356 is threaded into bore 712.

Check valve 325 is disposed within bore 712 in threaded mating engagement. It is sealed within bore 712 by two O-rings 740 and 742 that extend circumferentially around the body 744 of check valve 325 and provide sealing contact between check valve 325 and bore 712. External threads 746 are provided on an outer cylindrical portion of body 744 and are threadedly engaged with internal threads formed in an inwardly facing surface of bore 712. Valve body 744 defines an internal chamber 750 that extends substantially the entire length of check valve 325. This chamber is open at its inwardly facing end shown by opening 752 to permit fluid to flow into and out of check valve 325. Interior chamber 750 also supports a moveable valve element 754 that has an interior chamber 756 that is in fluid communication with the outer surface of valve element 754 and hence with opening 752 and chamber 636 through orifice 345. Valve seat is provided on a conical outer surface 757 of element 754 that engages with a mating inner seat 758 on the inner surface of valve body 744. Valve body 744 includes a plurality of fluid passageways 761 that extend between inner chamber 750 of valve body 744 and an outer surface of valve body 744. These passageways are disposed in the region of conduit 708 thereby permitting free fluid flow from interior chamber 750 to conduit 708. A helical spring 762 is disposed in valve body 744 having one end that abuts a closed end cap of valve body 744 and another end abutting moveable valve element 754. Valve element 754 is slidingly supported within chamber 750 such that spring 762 forces it against seat 758. When pressure is applied at opening 752 through chamber 636, this pressure acts against conical surface 757 and forces it leftwardly ("left" as in FIG. 7) with respect to valve body 744 so that its movement compresses spring 762. When element 754 moves to the left, fluid is permitted to flow in the gap between conical surface 757 and valve seat 758 into chamber 750. Once fluid has entered chamber 750 by the movement of moveable element 754, it can escape check valve 325 through annular passageway 760 which is in fluid communication with conduit 708 via holes 761 in body 744. Spring 762 is preferably selected such that it takes a fluid pressure of approximately 100 psi acting on the end of element 754 to move element 754 to the left away from seat 758 and thus provide a fluid passageway to chamber. In this manner, a pressure differential of 100 psi is provided between chamber 636 and fluid conduit 708 whenever fluid flows from chamber 636 through check valve 325 and into conduit 708. Orifice 345 provides a parallel bidirectional flow path between chamber 636 and conduit 708. Thus, while there is generally a 100 psi pressure differential, there may be some small flows through orifice 345 in any case. And when the pressure differential across check valve 325 drops below 100 and hence check valve 325 is closed, there will still be some small flow through orifice 345. Moveable element 754 and valve seat 758 are preferably selected to provide around a 20 gal/min flow rate. Orifice 345 has a preferred diameter of around 0.030 inches, and thus provides a much smaller flow rate. Not shown here but existing in the preferred embodiment is a fluid flow passageway formed through the side of valve body 744. This passageway provides a fluid coupling between conduit 708 and chamber 766 that is in fluid communication with interior chamber 756 of element 754.

To remove orifice 356, check valve 325 must first be taken out of valve body 402. An insertion and removal tool, such as a spanner wrench, is placed across the wrenching flats or surfaces 430 of check valve 325. Check valve 325 is then rotated in a counter clockwise direction unthreading threads 746 from their mating threads in bore 712 and thereby backing check valve 325 out of bore 712. When the threads are disengaged, check valve 325 can be extracted axially out of bore 712. The removal of check valve 325 provides a straight tool access cavity extending between outer surface 714 of valve body 402 and the tool engaging surfaces 728 of orifice 356. With check valve 325 removed, an insertion and extraction tool such as an "Allen" wrench may be inserted substantially coaxially with axis 722 of bore 712 until the part engaging surfaces of that tool engage surfaces 728 of orifice 356. At which point, the tool, which now extends from outside valve body 402 into bore 712 and engages with orifice 356, is rotated in a counter clockwise fashion breaking the surface-to-surface engagement of flange 738 with bore 712 and unthreading mating threads 732 and 734 until orifice 356 is completely unthreaded. At which point, the tool can be extracted from bore 712 in a direction generally parallel to axis 722 together with orifice 356 until orifice 356 has been completely removed from bore 712. Replacement of orifice 356 and check valve 325 is accomplished by performing the steps described above in reverse order and reverse direction.

As shown in FIG. 3 and also in FIGS. 6 and 7, the primary function of check valves 335, 325, 340 and 330 and of orifices 345 and 350, is to control the flow of fluid between input ports 406 and 408 and their respective output ports 416 and 418. In this controlling process, these check valves and orifices provide predetermined pressure drops and flow rates of the flow proceeding from the input ports to the output ports and vice-verse. This is described in more detail above with regard to FIG. 3. Another function of the circuit shown in FIG. 3 and embodied in FIGS. 4–10 is that of providing a fluid flow between the fluid hydraulic lines 240 and 250 shown in diagram form in FIG. 3 and in physical form in FIGS. 4–10. Flow between hydraulic lines 240 and 250 is regulated by cross-over valve 305 which, in turn, is controlled by the hydraulic timing system and the motion detection system which selectively provide flow from one of conduits 240 or 250 to one of the other ends of crossover valve 305. Cross-over valve 305 is shown in FIG. 7, and in FIG. 8 in partial detail. Cross-over valve 305 includes a spool 770 shown in FIGS. 3, 7 and 8 that moves up and down within a cavity 772. Cavity 772 is a part of bore 720 which is formed in bottom surface 404 and extends upwardly generally perpendicular to surface 404. A spring 776 biases the spool upward and tends to close the cross-over valve 305 preventing flow between bore 712 and 716. When no pressure is applied, or no differential pressure is applied to either end of spool 770, valve 305 is closed. Spring 776 is selected to preferably apply a pressure against spool 770 sufficient to balance a 40 psi net fluid pressure acting on the top surface of spool 770. In other words, the pressure differential of the pressure applied to the top of the spool and the bottom of the spool preferably exceeds 40 psi before spool 770 will shift downward, compressing spring 776 and providing a flow path between bores 712 and 716 through cavity 772. It is this cross-over flow between bores 712 and 716 that give the cross-over valve 305 its name. When spool 770 is shifted downwards, flow is provided between hydraulic lines 355B and 360B as shown both in FIG. 3 and in FIGS. 7 and 8.

There are several components within spool 770 itself that regulate the rate at which spool 770 shifts. These components are shown in FIG. 3 as delay orifice 380 and thermal actuated valve 365. These elements, including hydraulic line 395 which provides a fluid signal path between the elements and the bottom of spool 770 (shown as the top portion of spool 770 in FIG. 3) and the hydraulic line 778 (FIG. 3) that couples these elements to the top of spool 770 (the bottom of spool 770 as shown in FIG. 3) via hydraulic volume 375 are all contained within spool 770 itself.

Cavity 772 (and bore 720 of which it is a part) is enclosed by a cap 780 that is threadedly engaged with a threaded portion 782 of bore 720 to which it is sealed by O-ring 784. The head, 786, of cap 780, is recessed in counter bore 788 formed in surface 404 of valve body 402. In this manner, head 786 is recessed below (or rather "above", as shown in FIG. 7) lower surface 404 providing a convenient and smooth mounting surface 404. Cap 780 has an internal hollow cavity in which the lower end (FIG. 7) of spring 776 is supported. Cap 780 also prevents the leakage of fluid out of bore 720 by sealing off the lower, open end of bore 720 once spool 770 and spring 776 have been inserted. The upper end of bore 720 is configured to support a filter 370 that extends across the opening of in portion 790 of bore 720. Filter 370 is disposed between spool 770 and bore 792, which intersects bore 720. As better shown in FIG. 10, bore 720 is intersected by two bores, an upper bore 792 and a lower bore 706 that intersect and provide fluid communication between bore 720 and bores 792 and 706. Bore 792 is configured to intersect an upper portion of bore 720 and also to intersect bore 602 (FIG. 10) at a central portion of bore 602 disposed between check valves 315 and 320. This point of intersection of bore 602 is shown in FIG. 6 as a dashed circle disposed between check valves 315 and 320. Thus, bore 720 intersects bore 792 which in turn intersects bore 602 thereby defining the fluid passageway shown in FIG. 3 as hydraulic line 375.

Figure 10:
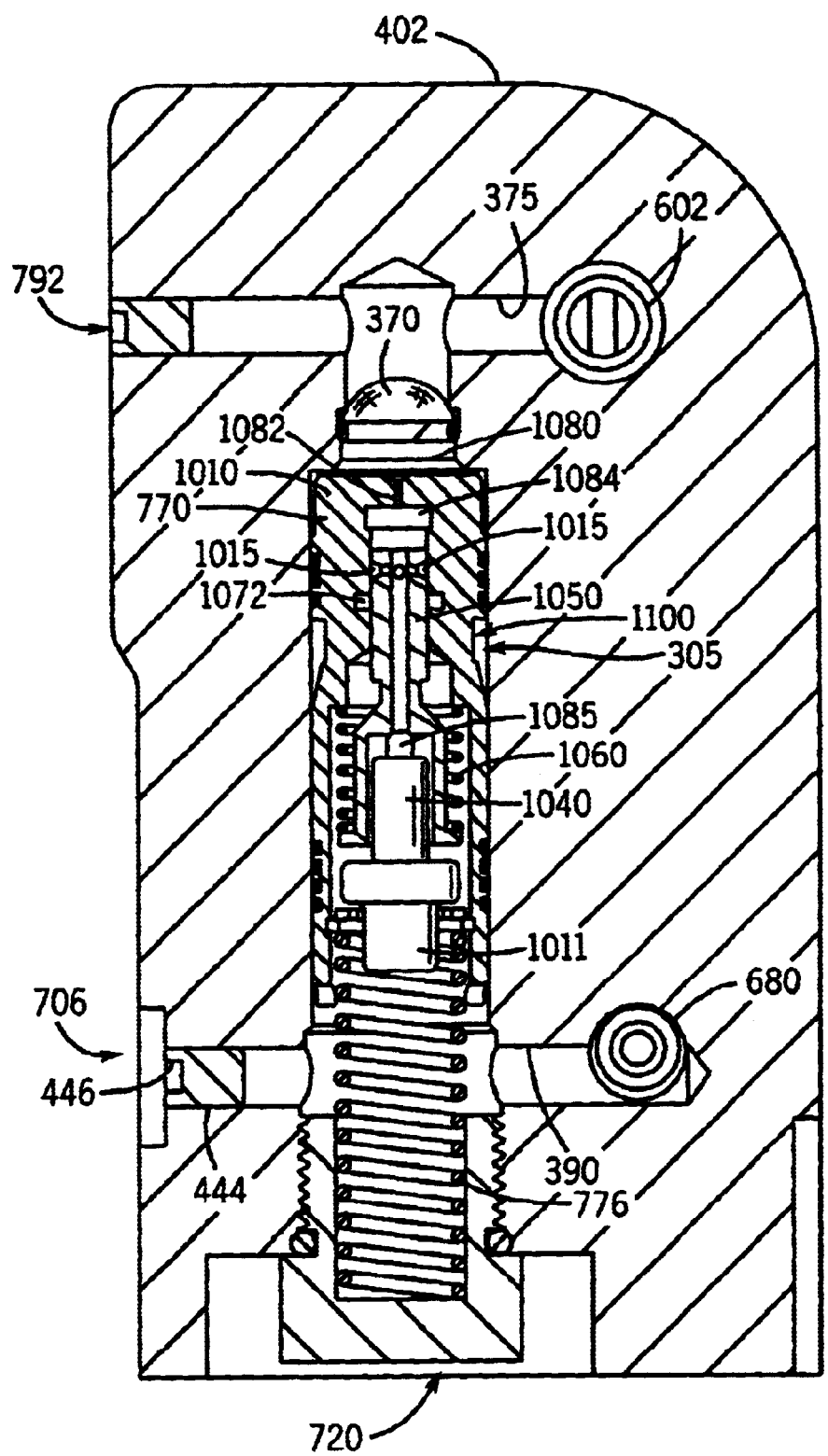
FIG. 10 is a sectional view of the device of FIGS. 4–9 taken at section line 8—8 in FIG. 7.

As also shown in FIG. 10, bore 706 intersects both bores 680 and bore 720, thereby defining the fluid flow path identified as hydraulic line 390 in FIG. 3.

When the fluid pressure differential across spool 770 is greater than about 40 psi, (i.e., the pressure in line 778 (volume 375) minus pressure in hydraulic line 390 is greater than about 40 psi) spool 770 will open by moving downwards towards lower surface 404 compressing spring 776. Spool 770 of cross-over valve 305 has several internal components represented in FIG. 3 as items 395, 380, 365 and 778.

Figure 8:
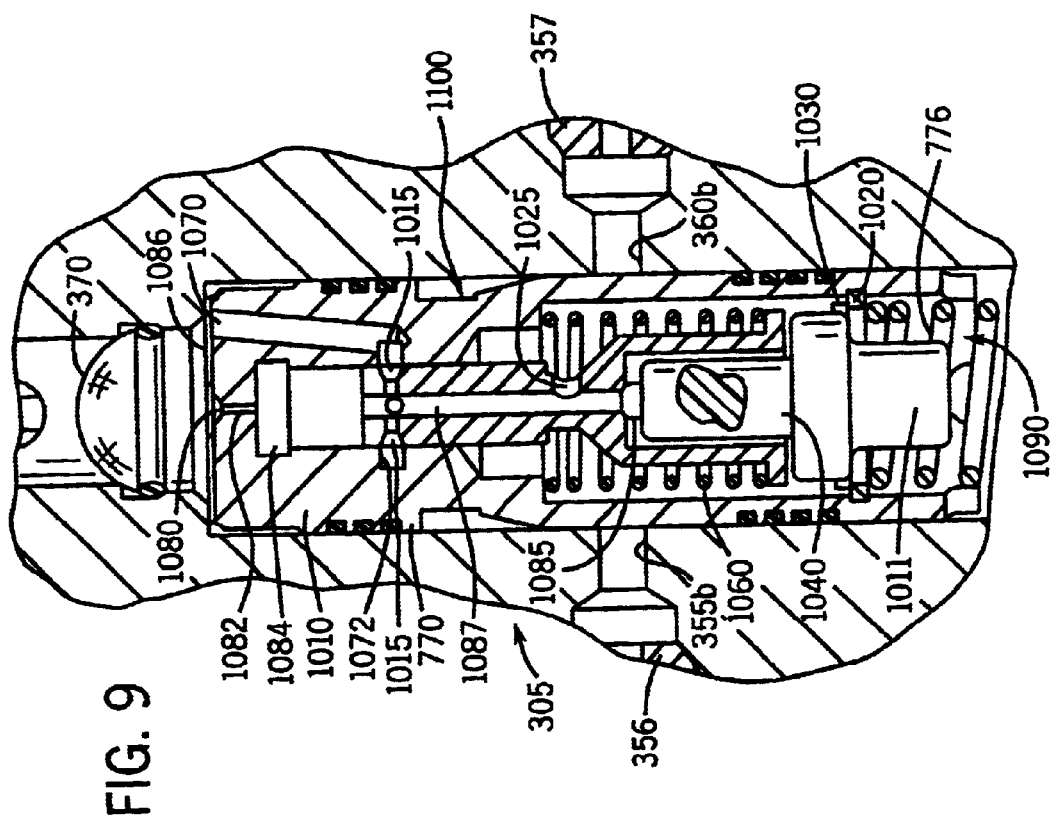
FIG. 8 is a partial sectional view of the device of FIGS. 4–7 taken at section line 8—8 in FIG. 7.

Referring to FIGS. 7 and 8, one embodiment of spool 770 is generally shown at numeral 1100. Components of spool 770 can include a main body 1010, an orifice spool 1050, a thermal element 1040, and a pin 1085. The thermal element can be a temperature sensitive or 'thermal' polymer. In one embodiment, the thermal polymer is supplied by Caltherm Corporation. The main body 1010, orifice spool 1050 and pin 1085 can be made from various rigid material including metals, polymers, or any combination thereof in alternate embodiments. In one embodiment, the main body 1010 is milled to support all other components internally. The main body 1010 includes a hydraulic fluid entry 1065, which, in the embodiment shown includes a primary hydraulic input 1070, and a secondary hydraulic input 1080. The primary hydraulic input 1070 can be located on one end of the main body 1010, and meters the more viscous hydraulic fluid, as when it is cold. In the center of the same end of the main body 1010 can be the secondary hydraulic input 1080 that meters less viscous hydraulic fluid. The hydraulic fluid entering through the primary 1070 and secondary 1080 hydraulic inputs may be unique to each, or may be common to both. In order to control the fluid pressure of varying temperature hydraulic fluid, it is necessary to restrict the flow of the fluid as it becomes less viscous. The diameter of the secondary hydraulic input 1080 can be smaller then the primary hydraulic input 1070 to achieve this purpose. Hydraulic input 1080 defines the opening of a narrowed passageway 1082 that fluidly couples the top surfaces 1086 of the upper end of spool 770 to the top surface of orifice spool 1050. This narrow passageway provides fluid communication from the top of spool body 1010 to the top of orifice spool 1050 and is shown schematically in FIG. 3 as orifice 380 and hydraulic line 395. Hydraulic line 395 in FIG. 3 represents the physical relationship that hydraulic fluid passing through the upper portion of bore 720 is communicated to input 1080 and thence is permitted to flow through passageway 1082 (orifice 380 in FIG. 3) to the upper surface of orifice spool 1050.

Figure 9:
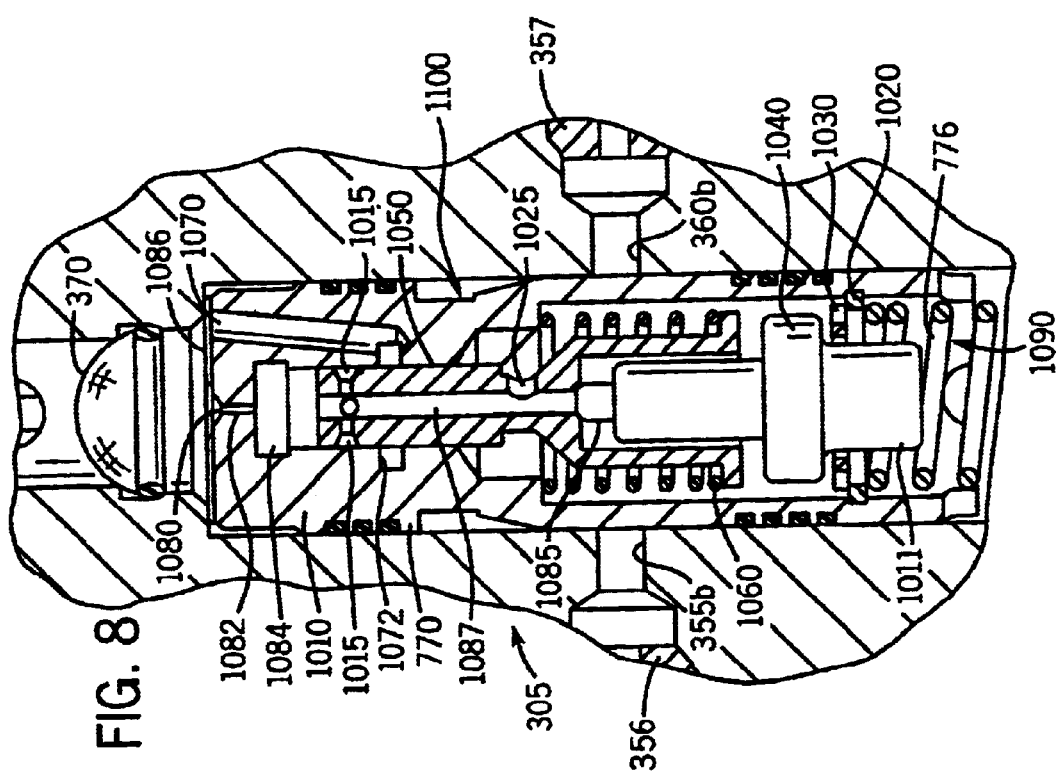
FIG. 9 is a fragmentary sectional view of the device of FIGS. 4–8 similar to that of FIG. 8, but showing the orifice spool in a downwardly shifted position.

The orifice spool 1050 can be in communication with the primary hydraulic input 1070, the secondary hydraulic input 1080, the spring 1060, and the pin 1085. The orifice spool 1050 is hollow to allow continual passage of fluid from the secondary hydraulic input 1080 to proceed through a second port 1025 to the hydraulic exhaust 1090. Additionally, the orifice spool 1050 has metered holes (also known as orifices) 1015 located on its length to allow and disallow fluid from the primary hydraulic input 1070 to proceed to the second port 1025, from whence fluid continues on to the hydraulic exhaust 1090. There are preferably four metered holes 1015 disposed equiangularly and radially about the longitudinal axis of orifice spool 1050. When the spool 770 is cold, or rather when the hydraulic fluid passing through spool 770 is cold, pin 1085 retracts within thermal element 1040 and orifice spool 1050 moves downward to the position shown in FIG. 9. As can be seen in FIG. 9, fluid flow passing into hydraulic input 1070 from the top of spool body 1010 passes through hydraulic input 1070 until it reaches annular volume 1072. Annular volume or passageway 1072 permits fluid to flow about the periphery of orifice spool 1050 thereby providing a balanced load on the spool in all directions and reducing the chance that the spool will bind. In addition, fluid in annular volume 1072 is conducted into all four of metered holes 1015 that extend around the periphery of spool 1050. Each of these metered holes functions as an orifice and collectively are represented in FIG. 3 as the flow path through item 365. Referring again to FIG. 3, it can be seen that item 365 is movable to a closed position in which flow is prevented. This closed position is provided when spool 1050 is in the position shown in FIG. 8. In FIG. 8, the spool is moved upwards by pin 1085 until fluid introduced into annual space 1072 can no longer pass through metered passageways 1015. Thus, when the hydraulic fluid is warm and orifice spool 1050 is in the position shown in FIG. 8, hydraulic fluid can flow from the top surface 1086 of spool body 1010 to the bottom of spool body 1010 through passageway 1082 into chamber 1084 defined in spool body 1010 above orifice spool 1050, through central longitudinal passageway 1087 which communicates fluid from the top of orifice spool 1050 to second port 1025, thence through port 1025, downward around the outer surface of the lowest portion of orifice spool 1050 and around the outer surface of thermal element 1040 and thence through gaps in fluid by-pass washer 1030. At this point, the hydraulic fluid has reached the bottom of spool 770 and therefore hydraulic exhaust 1090.

The hydraulic system can also include a biasing member 1060, including for example, a spring, or the like. In the embodiment shown, one end of the biasing member or spring 1060 can be in communication with the interior of the main body 1010, while the spring's other end can be in communication with the orifice spool 1050. In the "cold" state of the spool 770, shown in FIG. 9, the orifice spool 1050 is held in a position allowing fluid to flow from the primary input 1070 through the metered holes 1015, to the second port 1025. Thus, in the embodiment shown, the orifice spool 1050 is biased by the biasing member 1060 in an open flow position.

The thermal element 1040 is positioned within the body 1010 and is in communication with the orifice spool 1050 by means of the pin 1085. The thermal polymer used in the thermal element 1040 can be molded to any shape, and in one embodiment, is contained within a membrane or bladder 1011. In one embodiment, the membrane 1011 is made of rubber, but may be made of any suitable flexible and/or elastic material. The membrane 1011 may fully cover the thermal element, or a portion of the thermal element that contacts with the pin 1085. In one embodiment, the pin 1085 is in communication with the membrane of the thermal element 1040 and moves with the expansion and contraction of the thermal polymer. As the fluid temperature warms or increases, the thermal polymer expands by a measurable displacement, moving the pin 1085 upward (FIG. 8).

The FIG. 8 embodiment of spool 770 is shown in the "warm" state. The embodiment of FIG. 9 shows spool 770 in the "cold" state, in which hydraulic fluid can pass into inlet 1070 as a secondary flow path from the top of spool 770 to the bottom (or the bottom to top, as shown in FIG. 3). As the fluid temperature increases, the thermal element 1040, forces the pin 1085 against the orifice spool 1050 with enough force to compress the spring 1060. As the thermal element 1040 extends the pin 1085, the orifice spool 1050 shifts to restrict or close off the metered holes 1015 and restrict fluid flow to only flow through the secondary hydraulic input 1080 and not through input 1070. As the fluid temperature decreases, the spring 1060 returns the orifice spool 1050 to the open flow or original "cold" position as shown in FIG. 9.

A by-pass washer 1030 can be positioned in communication with the hydraulic exhaust end of the thermal element 1040 to allow fluid flow around the thermal element 1040. A snap ring 1020 can be positioned in communication with the thermal element 1040 and the main body 1010 to retain the components within the main body 1010.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A swing damping valve for a backhoe, the backhoe having at least one swing cylinder having an extend and a retract port for swinging a backhoe boom in two directions about a substantially vertical axis, and a directional control valve coupled between a hydraulic tank and a hydraulic supply and configured to provide fluid to the extend and retract ports of the at least one swing cylinder through an extend port and a retract port line wherein the valve comprises:

a valve body having a first port configured to be coupled to the extend port of the directional control valve, a second port configured to be coupled to the retract port of the directional control valve, a third port configured to be coupled to move the swing cylinder in a first of said two directions and a fourth port configured to be coupled to move the swing cylinder in a second of said two directions, wherein the valve body further defines a first fluid flow conduit configured to permit bidirectional flow between the first and third port, and a second conduit configured to permit bi-directional flow between the second and fourth ports, and wherein the valve body further defines a third conduit coupling the first and second conduits; and a movable cross-over valve element disposed in the valve body and in the flow path defined by the third conduit to selectively block flow through the third conduit in response to a difference in pressure between the first and second conduits.

2. The swing damping valve of claim 1, wherein the valve body defines a spool-receiving cavity, and further wherein the movable cross-over valve element is a spool slidably disposed within the spool-receiving cavity and configured to substantially block fluid flow through the third conduit when in a first spool position within the spool-receiving cavity and to permit fluid flow through the third conduit when in a second spool position in the spool-receiving cavity.

3. The swing damping valve of claim 2, wherein the valve body further defines a first hydraulic signal line fluidly coupled to the first conduit at a first location on the first conduit and fluidly coupled to the spool-receiving cavity.

4. The swing damping valve of claim 3, wherein the valve body further defines a second hydraulic signal line fluidly coupled to the second conduit at a second location on the second conduit and fluidly coupled to the spool-receiving cavity.

5. The swing damping valve of claim 4, wherein the first and second hydraulic signal lines are generally coaxial.

6. The swing damping valve of claim 4, wherein the first and second hydraulic signal lines have substantially the same length and diameter.

7. The swing damping valve of claim 4, further including first and second check valves disposed in the first and second hydraulic signal lines.

8. The swing damping valve of claim 7, wherein the first and second check valves are spring biased to provide generally the same pressure drop and resistance to fluid flow.

9. The swing damping valve of claim 7, wherein the first and second check valves are formed as a unitary subassembly including a ball, a ball cage and a ball seat.

10. The swing damping valve of claim 1, wherein the first and second conduits provide a flow rate of between 10 and 30 gallons per minute with a frictional pressure drop of between 7 and 30 pounds per square inch.

11. The swing damping valve of claim 2, wherein the third conduit is defined by first and second bores in the valve body.

12. The swing damping valve of claim 11, wherein the first bore intersects the first conduit and the second bore intersects the second conduit.

13. The swing damping valve of claim 11, wherein the first and second bores are generally coaxial.

14. The swing damping valve of claim 11, wherein the first and second bores are stepped.

15. The swing damping valve of claim 14, wherein each of the first and second bores has at least a first stepped portion configured to receive and support a first flow check valve.

16. The swing damping valve of claim 15, wherein the first flow check valves in each of the first and second bores provide substantially the same flow rate for a first predetermined pressure drop across the first flow check valves.

17. The swing damping valve of claim 16, wherein the first flow check valves in the first and second bores are formed as a cartridge including a seat, a ball and a ball cage.

18. The swing damping valve of claim 16, wherein the first flow check valve in the first bore is formed as a cartridge and is disposed to block fluid flow through the first conduit, and further wherein the first flow check valve in the second bore is formed as a cartridge and is disposed to block fluid flow through the second conduit.

19. The swing damping valve of claim 11, wherein a first portion of the first conduit is defined by the first bore and a second portion of the second conduit is defined by the second bore.

20. The swing damping valve of claim 19, wherein the first flow check valve is at least partially disposed in the first portion of the first conduit and the second flow check valve is at least partially disposed in the second portion of the second conduit.

21. A swing damping valve for damping oscillations in an articulated boom that is pivotable about a vertical axis by at least one hydraulic actuator controlled by at least one flow control valve, wherein the valve comprises:

a valve body having a first valve body port configured to be coupled to a first port of the at least one flow control valve, a second valve body port configured to be coupled to a second port of the at least one flow control valve, a third valve body port configured to be coupled to move the at least one hydraulic actuator in a first direction and a fourth valve body port configured to be coupled to move of the at least one hydraulic actuator in a second direction, wherein the valve body further defines a first fluid flow conduit configured to provide substantially all the flow between the first and third valve body ports and a second fluid flow conduit configured to provide substantially all the flow between the second and fourth valve body ports, and further wherein the valve body further defines a third hydraulic fluid line coupling the first and second conduits; and a movable cross-over valve element disposed in the valve body and in the flow path defined by the third hydraulic fluid line to selectively block flow through the third conduit in response to a difference in pressure between the first and second conduits, wherein the movable cross-over element is responsive to hydraulic pressure flows in the first and second conduits to open and permit a quantity of fluid sufficient to reduce oscillation of the articulated boom to pass through.

22. The swing damping valve of claim 21, wherein the valve body further defines a first hydraulic signal line that extends between the first and second fluid flow conduits that is configured to conduct fluid from the first conduit and the second conduit against a first actuating surface of the movable crossover element, wherein the movable cross-over element is disposed in the valve body such that hydraulic pressure applied to the first actuating surface of the movable cross-over element tends to move the element in a direction that interrupts flow through the third conduit.

23. The swing damping valve of claim 22, wherein the valve body further defines a second hydraulic signal line that extends between the first and second conduits and is configured to conduct fluid flow from the first conduit and the second conduit to a second actuating surface of the movable cross-over element, wherein the movable cross-over element is disposed in the valve body such that hydraulic pressure applied to the second actuating surface of the movable cross-over element tends to move the element in a direction that permits flow through the third conduit.

24. The swing damping valve of claim 23, wherein the third conduit and the movable cross-over element are disposed to provide flow through the third conduit from the first conduit to the second conduit and from the second conduit to the first conduit.

25. The swing damping valve of claim 22, wherein the valve body defines at least a first bore and the at least a first bore defines the first hydraulic signal line.

26. The swing damping valve of claim 25, wherein the valve body defines at least a second bore, and further wherein the at least a second bore defines the third conduit.

27. The swing damping valve of claim 26, wherein the at least a first bore and the at least a second bore define substantially parallel longitudinal axes.

28. The swing damping valve of claim 27, wherein the valve body defines at least a third bore and further wherein the at least a third bore defines the third hydraulic signal line.

29. The swing damping valve of claim 28, wherein the at least a second bore and the at least a third bore have generally parallel longitudinal axes.

30. The swing damping valve of claim 29, wherein the at least a second bore and the at least a third bore are generally coaxial.

31. The swing damping valve of claim 21, wherein the movable crossover valve includes at least a first valve spool, and further wherein the valve body defines a spool-receiving cavity configured to receive and support the valve spool.

32. The swing damping valve of claim 31, wherein the movable crossover valve further includes a thermal element responsive to a temperature of hydraulic fluid.

33. The swing damping valve of claim 31, wherein the first valve spool defines a first internal hydraulic fluid flow path configured to conduct hydraulic fluid through the valve spool at a first controlled rate.

34. The swing damping valve of claim 33, wherein the first valve spool defines a second internal hydraulic fluid flow path configured to conduct hydraulic fluid through the valve spool at a second controlled rate different from the first controlled rate.

35. The swing damping valve of claim 31, wherein the movable crossover valve includes a second valve spool disposed within the first valve spool to selectively open the second internal hydraulic flow path.

36. The swing damping valve of claim 21, wherein the valve body further defines a first hydraulic signal line extending between the first and second conduits and coupling the first and second conduits to an actuating surface of the first valve element.

37. The swing damping valve of claim 36, wherein the first hydraulic signal line is defined by a longitudinal bore in the valve body that intersects the first and second conduits.

38. The swing damping valve of claim 36, further including a bidirectional check valve and further wherein the first hydraulic signal line is defined by a first longitudinal bore and the bi-directional check valve is disposed inside the longitudinal bore and is fixed to an inner surface of the longitudinal bore.

39. The swing damping valve of claim 38, wherein the bi-directional check valve is formed as a cartridge that is threadedly engaged to the inner surface of the longitudinal bore.

40. A swing damping valve for damping oscillations in an articulated boom that is pivotable about a vertical axis by at least one hydraulic actuator controlled by at least one flow control valve, wherein the valve comprises:

(a) a valve body having
  (i) a first port-providing surface;
  (ii) a first valve body port configured to be coupled to a first port of the at least one flow control valve and disposed in the first port-providing surface;
  (iii) a second valve body port configured to be coupled to a second port of the at least one flow control valve and disposed in the first port-providing surface;
  (iv) a second port-providing surface;
  (v) a third valve body port configured to be coupled to move the at least one hydraulic actuator in a first direction and disposed in the second port providing surface; and
  (vi) a fourth valve body port configured to be coupled to move the at least one hydraulic actuator in a second direction and disposed in the second port-providing surface, wherein the valve body defines a first internal fluid flow conduit configured to provide substantially all the flow between the first and third valve body ports and further defines a second internal fluid flow conduit configured to provide substantially all the flow between the second and fourth valve body ports, and further defines a third internal hydraulic conduit that couples the first and second conduits inside the valve body; and (b) a movable cross-over valve element disposed in the valve body and in the flow path defined by the third conduit to selectively block flow through the third conduit in response to a difference in pressure between the first and second conduits, wherein the movable cross-over element is responsive to hydraulic pressure flows in the first and second conduits to responsively open and permit a quantity of fluid sufficient to damp the swinging of the articulated boom.

41. The swing damping valve of claim 40, wherein the first and second valve body ports have first and second longitudinal axes, and further wherein the first and second longitudinal axes are generally parallel.

42. The swing damping valve of claim 41, wherein the third and fourth valve body ports have third and fourth longitudinal axes and further wherein the third and fourth longitudinal axes are substantially parallel.

43. The swing damping valve of claim 42, further comprising:

a first check valve having a first valve seat, a first movable sealing element, and a first spring configured to bias the first sealing element in a valve closed position against the first valve seat, and disposed in the first conduit both to prevent fluid from flowing in a first flow direction between the first and third valve body ports via a junction between the first valve element and the seat of the first check valve and to provide fluid flow in a second flow direction between the first and third valve body ports via the junction between the first valve element and the seat of the first check valve; and a second check valve having a second valve seat, a second movable sealing element, and a second spring configured to bias the second sealing element in a valve closed position against the second valve seat, and disposed in the second conduit both to prevent fluid from flowing in a third flow direction between the second and fourth valve body ports via a junction between the second valve element and the seat of the second check valve and to provide fluid flow in a fourth flow direction between the first and third valve body ports via the junction between the second valve element and the seat of the second check valve.

44. The swing damping valve of claim 43, wherein the first check valve is formed as first unitary body that includes the first sealing element, the first spring and the first seat of the first check valve, and further wherein the first unitary body is configured to be threadedly engaged with the valve body in the first conduit at a point between the first and third valve body ports.

45. The swing damping valve of claim 44, wherein the second check valve is formed as second unitary body that includes the second sealing element, the second spring and the second seat of the second check valve, and further wherein the second unitary body is configured to be threadedly engaged with the valve body in the second conduit at a point between the second and fourth valve body ports.

46. The swing damping valve of claim 43, wherein the first and second check valves have substantially the same cracking pressure and provide substantially the same differential pressure versus flow rate curves.

47. The swing damping valve of claim 40, wherein the movable valve element includes a spool disposed in a spool-receiving cavity defined by the valve body.

48. The swing damping valve of claim 47, wherein the spool has a first end and a second end and further wherein the spool is responsive to pressure applied to the first end and the second end to open and close the third conduit.

49. The swing damping valve of claim 48, wherein the valve body further comprises internal hydraulic lines configured to conduct fluid from the first conduit against the first and second ends of the spool with a first differential pressure between the first and second ends insufficient to move the valve in a first mode of operation.

50. The swing damping valve of claim 49, wherein a first check valve is disposed within the first conduit to provide a first pressure differential within the first conduit and between the first and the third valve body ports while fluid is conducted from the first to the third valve body ports.

51. The swing damping valve of claim 50, wherein the hydraulic lines include a first hydraulic line fluidly coupled to the first conduit on one side of the first check valve and a second hydraulic line fluidly coupled to the to the first conduit on the other side of the first check valve.

* * * * *